Aug. 9, 1966
T. A. RABSON ETAL
3,265,893
TEMPERATURE STABILIZED RADIOACTIVITY WELL LOGGING UNIT
Filed June 13, 1963
2 Sheets-Sheet 1
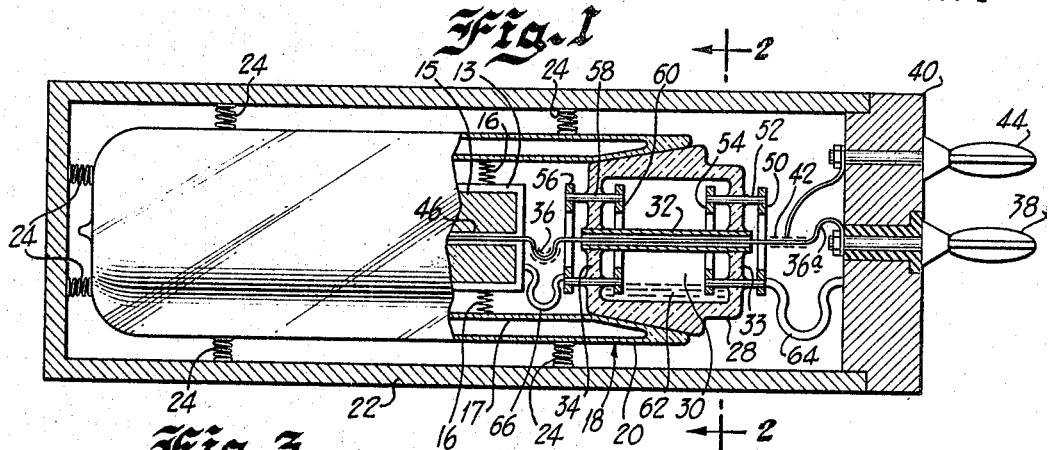
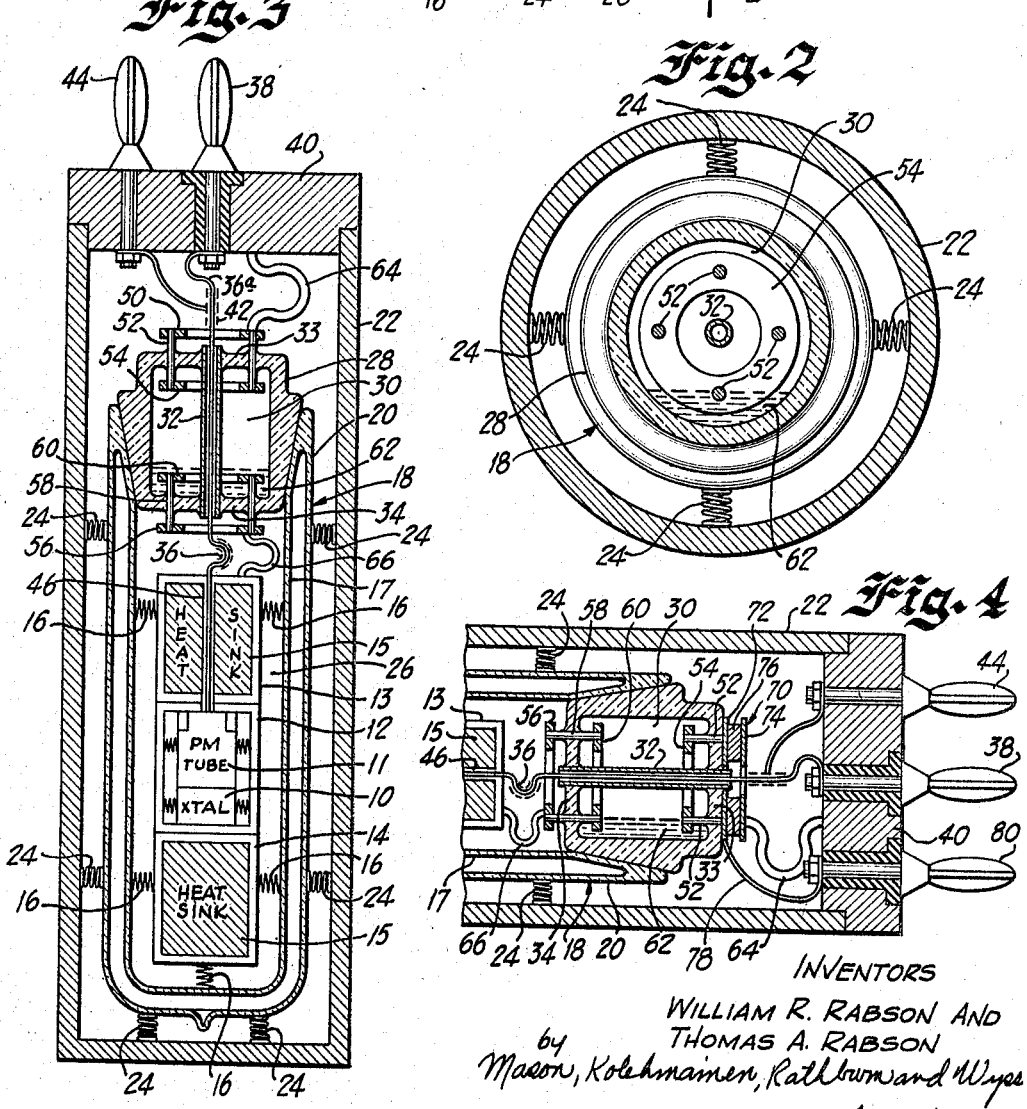
INVENTORS
WILLIAM R. RABSON AND
THOMAS A. RABSON
by Mason, Kolehmainen, Rathburn and Wyss
ATTORNEYS

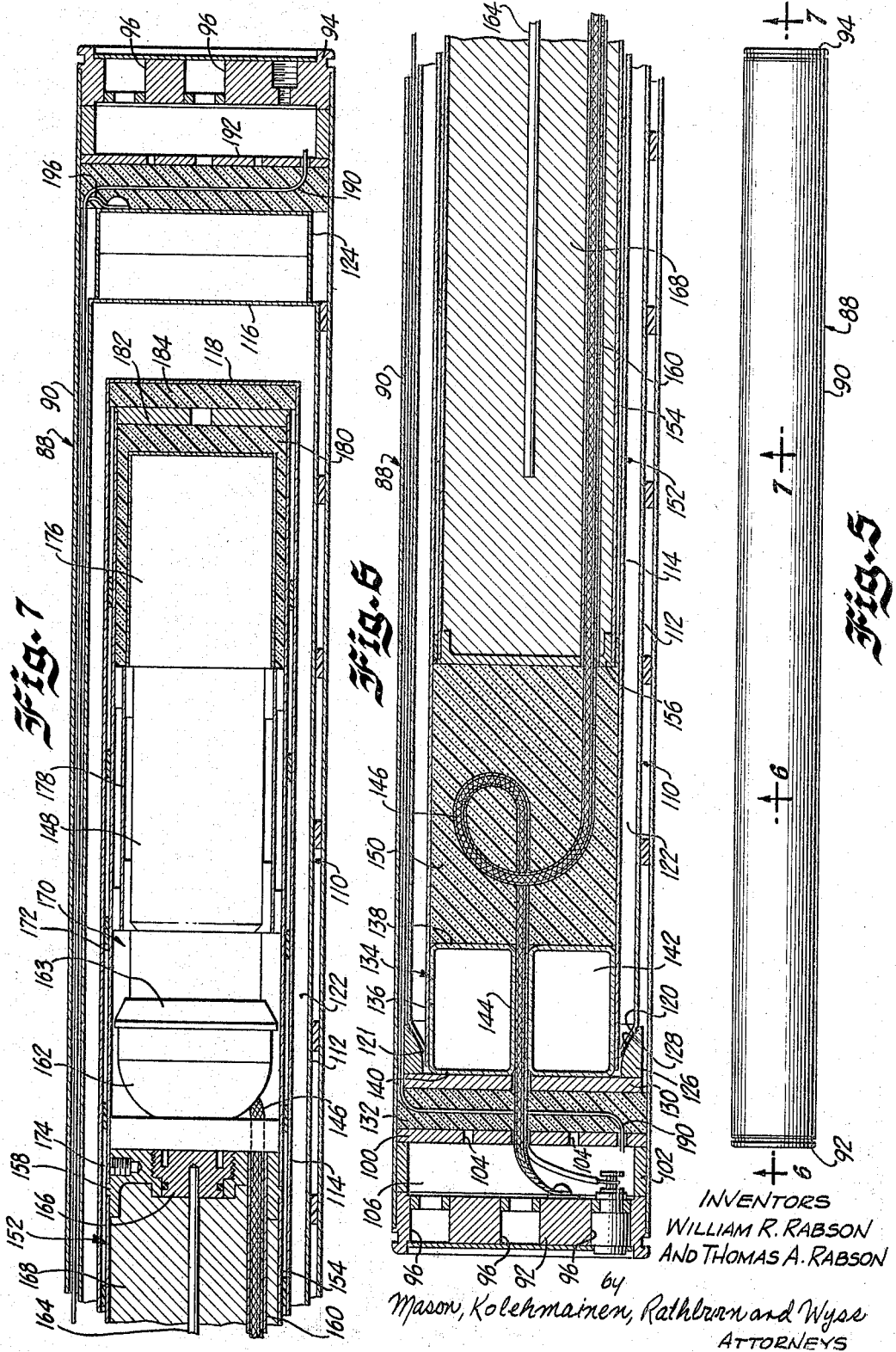

United States Patent Office 3,265,893
Patented August 9, 1966

3,265,893
TEMPERATURE STABILIZED RADIOACTIVITY WELL LOGGING UNIT
Thomas A. Rabson and William R. Rabson, Houston, Tex., assignors, by mesne assignments, to PGAC Development Company, Houston, Tex., a corporation of Texas
Filed June 13, 1963, Ser. No. 287,692
11 Claims. (Cl. 250—71.5)

The present invention relates to temperature stabilization of radioactivity well logging units, and, more particularly, to temperature stabilization of a well logging unit of the scintillation counter type which employs a scintillation crystal and associated photomultiplier tube to convert incoming radiations, such as gamma rays into corresponding electrical impulses.

Certain arrangements for temperature stabilizing scintillation counter type radioactivity well logging units have mounted the scintillation crystal and photomultiplier within a Dewar flask and included a mass of material within the flask which would tend to hold the temperature of the unit substantially constant as this mass of material melted or changed its state. While these arrangements are generally satisfactory, it has been found that the heat transfer through the stopper end of the Dewar flask is substantial to such an extent that the time during which the unit may be used in a high temperature well is severely limited. Furthermore in those prior art arrangements in which a self-contained heat sink is provided a long period of time, in the order of many days or weeks, is required to reset or return the heat sink material to its original temperature before the unit can be used in another well logging operation. This excessive reset time arises due to the fact that the temperature differential when the unit is being cooled at the earth's surface is substantially less than the temperature differential under which the unit is heated while in the well. For example, if the heat sink material is arranged to melt at 35° C., for example, so as to maintain the temperature within the Dewar somewhere in this neighborhood, the temperature within the unit after the well logging operation is completed will be approximately 35° C. When this unit is withdrawn from the well and is cooled at the earth's surface, and assuming a surface temperature of 25° C., a temperature differential of only 10° C. exists to cool off the unit. On the other hand, when the well logging operation is started and the heat sink material has a temperature of 25° C. and is placed in a well having a temperature of 200° C., a temperature differential of 175° C. exists tending to transfer heat into the interior of the unit. It will thus be evident that if the temperature stabilization system is to maintain the temperature within the logging unit for a period of 12 to 15 hours in a 200° C. well, this same stabilization unit will require many days to return to its initial temperature condition.

While it has been proposed to remove the stopper of the Dewar flask or Thermos bottle to reduce the reset time required to return the unit to its original temperature condition, this solution to the problem involves a mechanical assembly within the unit for removing this stopper. Furthermore, the possibility of leakage around the stopper is greatly increased when it must be removed and replaced each time the logging unit is used. As mentioned heretofore, the heat transfer through the stopper portion of the Dewar flask is a particularly important factor limiting the time during which the unit may be used in high temperature wells.

A further disadvantage of those types of logging units in which a self-contained heat sink mass is employed for temperature stabilization, is that the temperature of this heat sink mass starts out at the earth's surface temperature which may be in the order of 90 to 100° F. so that a relatively small temperature differential is available before the heat sink material melts and loses its temperature stabilizing effect. While certain arrangements have been proposed for freezing water surrounding the scintillation counter unit, or circulating a refrigerant to cool down the unit, these arrangements have required external connections to the logging tool and the provision of an external refrigeration unit to reduce the temperature of the unit below the earth's surface temperature.

It is, therefore, an important object of the present invention to provide a new and improved well logging unit of the scintillation counter type wherein one or more of the above disadvantages of the prior art arrangements are avoided.

It is another object of the present invention to provide a new and improved scintillation counter well logging unit wherein facilities are provided for mounting the scintillation crystal and photomultiplier unit of the system in such manner as to minimize the transfer of heat thereto so that the length of time the unit can be used in high temperature wells is substantially increased.

It is still another object of the present invention to provide a new and improved scintillation counter well logging unit wherein a self-contained heat sink arrangement is provided for temperature stabilization of the unit while minimizing the transfer of heat thereto so that the length of time the unit can be used in high temperature wells is substantially increased.

It is a further object of the present invention to provide a new and improved well logging unit wherein the transfer of heat to the unit during the logging of high temperature wells is minimized while, at the same time, providing facilities for rapidly returning the unit to a condition suitable for making another log.

It is a still further object of the present invention to provide a new and improved well logging unit wherein facilities are provided for establishing a liquid path of high heat conductivity in a sealed and self-contained temperature stabilization unit so that the unit can be rapidly returned to its original condition after logging in a high temperature well.

A further object of the present invention resides in the provision of a new and improved well logging unit having a self-contained system for temperature regulation which can be readily used without opening the unit and without requiring the connection of physical members to the unit at the earth's surface.

A still further object of the present invention is the provision of a new and improved well logging unit wherein a gravity operated system is employed to establish a liquid path of high heat conductivity to permit resetting of the unit to its original temperature condition in a rapid and reliable manner.

It is another object of the present invention to provide a new and improved well logging unit wherein a thermoelectric cooling device is employed for initially cooling the unit below the earth's surface temperature to prolong the usable logging time of the unit in high temperature wells.

It is a further object of the present invention to provide a new and improved well logging unit of the scintillation counter type wherein a heat sink is employed to temperature stabilize the scintillation counter and a thermoelectric cooling unit is employed to reduce the temperature of the heat sink below the earth's surface temperature prior to the logging operation so as to prolong the usable logging time of the unit in high temperature wells.

It is another object of the present invention to provide a new and improved well logging unit of the scintillation counter type wherein a thermoelectric cooling device is employed to cool the unit prior to logging and this cooling device is thermally disconnected from the temperature stabilization portion of the unit during the actual logging operation.

It is a further object of the present invention to provide a new and improved well logging unit of the scintillation counter type wherein the scintillation counter is positioned within an evacuated Dewar unit while, at the same time, providing facilities for reducing electrical pickup on the photomultiplier lead of the scintillation counter unit.

The invention, both as to its organization and method of operation, together with further objects and advantages thereof, will best be understood by reference to the following specification taken in connection with the accompanying drawings in which:

FIG. 1 is a somewhat diagrammatic cross sectional view of a well logging unit embodying certain features of the present invention;

FIG. 2 is a sectional view taken along the lines 2—2 of FIG. 1;

FIG. 3 is a sectional view of the unit of FIG. 1 shown in a vertical position;

FIG. 4 is a fragmentary sectional view of an alternative embodiment of the invention wherein a thermoelectric cooling device is employed;

FIG. 5 is a side elevational view of an alternative well logging unit according to the present invention embodying certain other features thereof;

FIG. 6 is a sectional view taken along the lines 6—6 of FIG. 5; and

FIG. 7 is a sectional view taken along the lines 7—7 of FIG. 5.

Referring now to the drawings, and more particularly to FIGS. 1 to 3, inclusive, thereof, the temperature stabilized well logging unit of the present invention is therein illustrated as comprising a scintillation crystal 10 (FIG. 3) positioned adjacent the end window of a photomultiplier tube 11, the crystal 10 and photomultiplier tube 11 being positioned within a first metallic housing 12. On either side of the housing 12 and in intimate heat transmitting contact relative to the end walls thereof, there is provided a pair of metallic housings 13 and 14 having included therein a mass of heat sink material 15. The housings 12, 14 and 15 are connected together by any suitable means to form an integral unit which is shock mounted by means of the springs 16 within the inner wall 17 of a Thermos bottle or Dewar flask indicated generally at 18. The outer wall 20 of the flask 18 is resiliently mounted within a tubular casing 22 of the well logging unit by means of the springs 24, it being understood that the space between the walls 17 and 20 of the flask 18 is evacuated by suitable evacuation techniques to prevent the transfer of heat into the interior 26 of the flask 18 from the casing 22 and the exterior environment.

In order to seal the upper end of the flask 18, a glass stopper 28 is provided which closes the upper end of the flask 18 and is provided with a central opening 30 which is evacuated so as to prevent the transfer of heat from the surrounding environment into the top end of the flask 18. The stopper 28 is provided with a tubular sleeve 32 positioned at the center of the stopper 28, which is also preferably made of glass, and is sealed to the top and bottom walls 33 and 34, respectively, of the stopper 28 so as to provide a conduit for a coaxial cable 36 the center conductor of which is connected to an insulated connector plug 38 insulatingly mounted in the metallic end wall 40 of the housing 22. The cable 36 is provided with a braided outer shield 42 which is connected to a grounding plug 44 positioned in the end wall 40. The cable 36 extends through the sleeve 32 and through a metallic sleeve 46 in the upper heat sink housing 13 to the photomultiplier tube 11 so as to provide the necessary high voltage connection to this photomultiplier tube, as will be readily understood by those skilled in the art.

In accordance with an important feature of the invention, an arrangement is provided for establishing a metallic path of high conductivity between the housing or casing 22 and the interior 26 of the Dewar flask 18 during periods when the housing 22 is positioned horizontally, as in FIG. 1. More particularly, a conductive ring 50 is mounted above the upper wall 33 of the stopper 28 on the ends of a plurality of conductive pins 52 which extend through the top wall 33 and a conductive ring 54 is connected to the bottom ends of the pins 52 within the evacuated space 30 in the interior of the stopper 28. Similarly, a conductive ring 56 is positioned beneath the bottom wall 34 of the stopper 28 and is secured to the bottom ends of a plurality of conductive pins 58 positioned in the bottom wall 34. A conductive ring 60 is secured to the upper ends of the pins 58 within the evacuated space 30. A pool of conductive liquid 62, such as mercury or the like, is positioned in the evacuated space 30 in sufficient amount to connect the conductive rings 54 and 60 within the evacuated space 30 when the housing 22 is positioned horizontally, as shown in FIG. 1. The upper end wall 40 of the housing 22 is connected to the upper conductive ring 50 by means of a heavy conductive cable 64, which may be similar to the braided ground strap used for batteries, and a similar heavy cable 66 is connected between the conductive ring 56 and the upper end of the metallic heat sink housing 13.

Considering now the operation of the above described well logging unit, when the unit is positioned vertically in the manner shown in FIG. 3 the mercury pool 62 does not interconnect the conductive rings 54 and 60 and hence the evacuated space 30 is effective to prevent the transfer of heat into the chamber 26 within the Dewar flask 18 during the logging operation. The heat sink material 15, which preferably has a high specific heat and has a melting or fusing point above normal room temperature but below approximately 65° C. so that the photomultiplier tube 11 is adequately protected, is in the embodiment of FIGS. 1 to 3 initially at the earth's surface temperature when the logging operation is started. As the unit is moved into a high temperature well, the casing 22 and end wall 40 thereof are heated to the high temperature of the surrounding environment. However, the transfer of heat into the interior space 26 within the flask 18 is substantially prevented by the evacuated space between the walls 17 and 20 of this flask and by the evacuated space 30 within the stopper 28. The conductive housings 12, 13 and 14 function to conduct heat which is either developed by the photomultiplier and its associated electronic circuitry in the housing 12, or is introduced from the exterior of the flask 18, to the heat sink material 15 so that this material is heated up to the melting or fusing point thereof, at which point the temperature of the logging unit stabilizes until all of the heat sink material 15 has been melted. As will be described in more detail in connection with the embodiment of FIGS. 5–7, the heat sink material is preferably arranged so that when the logging unit is immersed in a high temperature environment of 200° C., the logging operation can take place for approximately 15 hours before all of the heat sink material 15 is melted so that the operating temperature for the crystal 10 and photomultiplier tube 11 is stabilized at the melting point of the heat sink material 15 during this entire period.

When the well logging operation is completed and the unit has been withdrawn from the wall, the housing 22 is placed on its side, as shown in FIG. 1, in which position the mercury pool 62 provides a liquid path of high heat conductivity between the conductive rings 54 and 60 which are positioned within the evacuated space 30 and the stopper 28. Accordingly, heat which has been stored within the heat sink material 15 in the housings 13 and 14, may be rapidly conducted out of the logging unit over a path which includes the heavy conductor 66, the conductive ring 56, the pins 58, the conductive ring 60, the mercury pool 62, the conductive ring 54, the pins 52, the conductive ring 50 and the heavy conductor 64 to the end wall 40 of the housing 22. The housing 22 is thus thermally connected to the interior of the flask 18 so that it can act as an effective heat radiator and rapidly dissipate the heat which has been stored in the heat sink material 15 during the logging operation. As a result, the logging unit may be rapidly returned or reset to its initial operating temperature, at which point another logging operation may be started. In this connection it will be understood that the mercury pool 62 does not function to establish any electrical connection between the rings 54 and 60 but rather establishes a liquid path of high heat conductivity between these rings during periods when the housing 22 is positioned horizontally so as to establish the above described path for heat transfer to the housing 22.

While the mercury pool 62 has been described to provide the above described conductive heat path, it will be understood that other materials having a reasonably good thermoconductivity and which will be influenced by gravity may be employed within the space 30 to connect the conductive rings 64 and 60 when the logging unit is placed horizontally. For example, a good grade of vacuum pump oil may be employed instead of the mercury pool 62. However, it should be noted that the liquid conductive material within the space 30 should preferably have a low vaporization pressure so that it does not vaporize at the operating temperatures of the logging unit and destroy the vacuum within the space 30. Otherwise, the thermal insulating qualities which the space 30 provides during the logging operation would be lost.

It will also be noted that the cable 36 provides a continuous conductive path between the housing end wall 40 and the interior of the flask 18. However, the center conductor 36a of the cable 36 may be of very small diameter, in the order of No. 30 wire, so that the heat transmitting capabilities of this conductor are very small. Also, the braided shield 42 around the exterior of the cable 36 may be made of stainless steel which has low heat conductivity, in the event that a conventional braided shield 42 of copper transmits excessive heat into the interior of the flask 18. The external diameter of the cable 36 is preferably of such size that this cable fits snugly within the glass sleeve 32 so that heat cannot be transmitted through the air to the interior of the flask 18. If desired, any air spaces or crevices between the outer shield of the cable 36 and the sleeve 32 can be filled with powdered asbestos or other similar heat insulating material so as to prevent the direct transmission of heat over this path. It will also be understood that while the springs 24 and 16 have been indicated as providing shock mounting and heat insulation for the mounting of the flask 18 and the housings 12, 13 and 14, any other suitable arrangement for shock mounting and thermal insulation of the units within the housing 22 may be employed. For example, layers of silicon foam, or other suitable material which will withstand the high temperatures to which the logging unit is subjected, may be employed instead of springs, as will be readily understood by those skilled in the art.

In the embodiment of FIG. 4, an arrangement is provided for initially cooling the logging unit prior to the logging operation so that the logging time of the unit in high temperature wells is substantially prolonged. Furthermore, this initial cooling operation is achieved without requiring the connection of external pipes or refrigerants to the unit. In the embodiment of FIG. 4, a thermoelectric cooling unit indicated generally at 70 is mounted on the top wall 33 of the stopper 28. The cooling unit 70 comprises a pair of metallic plates 72 and 74, both of annular form, between which is positioned an annular body of material 76. The material 76 may comprise a compound such as bismuth telluride, antimony telluride, bismuth selenide, materials based on the pseudo-binary system, or any other suitable material or compound which utilizes the Peltier effect whereby a current flow between the plates 72, 74 produces a cooling effect wherein heat is transferred from the plate 72 to the plate 74 so that the plate 72 is cooled and the plate 74 increases in temperature.

In order to supply an electrical current to the cooling unit, 70, the plate 72 is connected by way of the conductor 78 to a plug connector 80 insulatingly mounted on the end wall 40. The plate 74 is electrically connected to the end wall 40 by means of the heavy conductor 64 which also acts as a heat transfer path during the cooling operation. The plate 72 is connected to the pins 52 which extend through the top wall 33 of the stopper 28 and are connected to the conductive ring 54, as in the embodiment of FIGS. 1 to 3, inclusive. In other respects the logging unit is substantially similar to that described heretofore in connection with the embodiment of FIGS. 1 to 3, inclusive.

Considering now the operation of the modified logging unit of FIG. 4, when the logging unit is positioned at the earth's surface, the temperature of the heat sink material 15 and the environment surrounding the photomultiplier tube 11 and crystal 10, will be at least as great as the surrounding surface temperature. Furthermore, this temperature will be much greater than the earth's surface temperature if a logging operation within a well has just been completed and the logging unit has just been withdrawn from the well. Under these conditions, the housing 22 is positioned horizontally and a current is supplied between the terminal 80 and the housing 22 so that a current flows in the thermoelectric cooling unit 70 in the proper direction to cool the plate 72 and transfer heat to the plate 74. When the logging unit is positioned horizontally a direct heat transfer path is established through the mercury pool 62 in the manner described above to the conductive ring 54 and through the pins 52 to the plate 72 of the thermoelectric cooling unit 70. Accordingly, the cooling unit 70 functions to withdraw heat rapidly from the interior of the logging unit and transfer this heat by way of the plate 74 and the heavy conductor 64 to the end wall 40 and housing 22 of the logging unit so that the internal heat of the unit may be rapidly dissipated. The cooling unit 70 is also effective to lower the temperature of the heat sink material 15 and the surrounding metallic structures substantially below the earth's surface temperature. Preferably the temperature of the heat sink material is reduced by the cooling unit 70 to the neighborhood of 0° C. When this lower temperature is reached, the current supplied to the thermoelectric cooling unit 70 is turned off and the logging unit may then be used in the next logging operation. Since the temperature of the heat sink material 15 has been substantially reduced below the earth's surface temperature, the time during which the logging unit may be used in a high temperature well before all of the heat sink material is raised to its melting or fusing point is substantially increased. Accordingly, the logging unit of the present invention may be employed to log high temperature wells for a time in excess of 15 to 20 hours so that extremely deep, high temperature wells may be logged with the equipment of the present invention. Furthermore, such a deep, high temperature well may be logged and after the logging unit has been brought to the surface, the internal temperature of the logging unit may be rapidly reset to its original temperature of 0° C. by resupplying current to the thermoelectric cooling unit 70 when the logging unit is positioned horizontally. In this connection it will be understood that the plug 80 is connected to one of the conductors of the logging cable so that it is not necessary to make any physical connection to the logging unit when it is positioned at the earth's surface to bring the internal temperature thereof to the desired low point prior to logging. On the contrary, the conductor of the logging cable to which the plug 80 is attached may be arranged in the logging truck so that it can be switched to a voltage supply of the proper voltage and current requirements so as to energize the thermoelectric cooling unit 70. It will also be noted that when the logging unit is positioned vertically for logging a well the thermoelectric cooling unit 70 is automatically disconnected from the interior of the logging unit due to the action of the mercury pool 62.

Since the thermoelectric cooling unit 70 is of extremely low resistance, the voltage supply for this unit customarily has a very low potential, in the order of 1/10 volt, and a high current capacity in the order of 10 to 20 amperes. This means that the conductor 78 carrying current to the plate 72 and the cable 64 carrying the return current are necessarily of large physical dimensions in order to carry the high current required by the thermoelectric cooling unit. For this reason, the thermoelectric cooling unit 70 is positioned on the top wall of the stopper 28 rather than on the bottom wall 34 so that the heavy conductors necessary to supply current to the thermoelectric cooling unit will not conduct heat through the evacuated zone 30 during the logging operation. This means that the thermoelectric cooling unit 70 will be subjected to the high temperatures encountered during the logging operation. However, the unit 70 is not required to function as a cooling unit during this logging operation and it is only necessary that this unit be able to function properly as a cooling unit once it has been returned again to the earth's surface temperature. However, it will be understood that the cooling unit 70 may, if desired, be positioned on the bottom surface of the end wall 34 of the stopper 28, in which case it will take the place of the conductive ring 56 and will function to cool the logging unit when at the earth's surface in the manner described in detail heretofore. In such an arrangement, the conductors employed to supply current to the plates of the thermoelectric cooling unit may conveniently be brought through the central sleeve 32 although as indicated heretofore, these conductors will necessarily provide a certain amount of heat transfer into the interior of the logging unit due to their physical size dictated by the current carrying requirements of the thermoelectric unit 70. Of course, when the thermoelectric cooling unit is positioned at the bottom end of the stopper 28 it is not subjected to the high temperatures encountered during the well logging operation and for this reason it may in certain instances be more desirable to position the thermoelectric cooling unit 70 in this manner.

In the arrangement shown in FIGS. 5-7, a preferred physical embodiment of the logging unit of the present invention is shown in detail. Referring to these figures, the logging unit 88 comprises an outer tubular sleeve 90 of stainless steel which is closed at either end by means of metal end walls 92 and 94 which are provided with suitable recesses 96 for insulatedly mounting a plurality of electrical connectors (not shown) whereby the logging unit 88 may be connected to other units of the logging system. The logging unit 88 is arranged to be positioned within a relatively thick outer tubular casing or housing (not shown) which is of sufficient strength to withstand the high pressures encountered during the well logging operation. The logging unit 88 is particularly designed so that the end wall 92 may be positioned at the bottom when the unit 88 is positioned vertically during the logging operation. However, the unit 88 is also arranged so that it may be turned end for end in the event that this position is required during a particular operation. When the logging unit 88 is used for simultaneous logging of natural gamma rays and radiations resulting from neutron bombardment of the formations by a neutron source, the logging unit 88 is preferably positioned above the other electronic circuitry of the logging system.

Immediately above the end wall 92 there is provided a metallic plate 100, which is spaced from the end member 92 by means of the collar 102 and is provided with a plurality of apertures 104 for the conductors of the logging system, the space 106 being employed to accommodate the terminals connected to the end wall 92 and the end portions of the conductors connected to these terminals. A Dewar flask, indicated generally at 110, is positioned above the plate 100 with the open end of the flask pointed downward. More particularly, the flask 110 comprises an outer tubular sleeve 112 of stainless steel and an inner tubular sleeve 114, also of stainless steel, these members being formed with the integral end portions 116 and 118, respectively. The bottom end of the outer sleeve 112 is provided with a tapered portion 120 the end of which is secured to the inner sleeve 114 by means of a suitable welding operation so as to provide the evacuated chamber 122 between the sleeves 112 and 114. A cover 124 is connected to the end 116 of the outer sleeve 112 so as to provide a protection for the tubulation required to evacuate the space 122, as will be readily understood by those skilled in the art.

In order to supply the Dewar flask 110 in an inverted position without placing undue strain on the weld 121 between the sleeves 112 and 114, there is provided an aluminum support member 126 in the form of an annular ring having a sloping upper wall 128 on which the tapered portion 120 of the outer sleeve 112 is adapted to seat. The ring 126 secured to a plate 130 which rests on a body of silicon foam material 132 positioned between the plate 100 and the plate 130 so that the Dewar flask 110 is shock mounted within the housing 90. The open end of the Dewar flask 110 is closed by means of a glass stopper indicated generally at 134 which is provided with the annular side wall 136 and end walls 138 and 140 which define the space 142 which is evacuated. A tubular glass sleeve 144 is provided at the center of the stopper 134 and is adapted to receive the shielded coaxial cable 146 employed to supply a high potential and receive signals from the photomultiplier tube 148 of the scintillation counter logging unit, as will be described in more detail hereinafter.

The stopper 134 is arranged to be forced into the bottom end of the inner sleeve 114 of the Dewar flask 110 so as to provide a complete closure for this flask. Also, it will be noted that the weight of the Dewar flask and the components positioned therein rests on the ring 126 so that no weight is placed on the weld 121. Immediately above the stopper 134 there is provided a mass 150 of silicone foam material which provides thermal insulation from the bottom end of the flask 110 and also provides for the shock mounting of a heat sink assembly indicated generally at 152. The assembly 152 comprises a tubular sleeve 154 of stainless steel which is closed at one end by means of a stainless steel end cap 156 and at the other end by means of a transverse end wall 158. A stainless steel tube 160 is positioned between and extends through the end walls 156 and 158 and is provided to receive the cable 146 so that this cable can be connected to the electronic circuitry, indicated generally at 162, associated with the socket 163 of the photomultiplier tube 148. A copper rod 164 is positioned longitudinally of the heat sink assembly 152 and is connected to a removable plug member 166 which is threaded into the end wall 158. The space 168 within the sleeve 154 may thus be filled with a mass of heat sink material, while the rod 164 is removed and after this filling operation the rod 164 may be inserted into the space 168 and the plug 166 threaded into the end wall to close this end of the heat sink assembly. The rod 164 facilitates the transfer of heat developed by the electronics associated with the photomultiplier tube 148 into the mass of heat sink material in the space 168. In this connection it is pointed out that FIGS. 6 and 7 are sectional views taken at the points indicated in FIG. 5 and the space 168 actually has a length which is over six times the length of the foam material 150 so that a substantial volume of heat sink material is provided.

The heat sink material in the space 168 may comprise any suitable material having a high heat of fusion so that this material can absorb a relatively large amount of heat without a rise in temperature above the melting point of the material. However, it is also important that a relatively large quantity of material can be included within the given volume of the space 168 in the heat sink assembly 152. Compounds such as $Cd(NO_3)_2 \cdot 4H_2O$; $Ca(NO_3)_2 \cdot 4H_2O$; $Na_2HPO_4 \cdot 12H_2O$; $Na_2SO_4 \cdot 10H_2O$; $Zn(NO_3)_2 \cdot 6H_2O$ and $N_2O_5$ may be employed as the heat sink material. While nitrogen pentoxide has the highest index of heat of fusion times density, this compound has the relatively low melting temperature of 29.5° C. Accordingly, this compound may have difficulty returning to the solid state when it is returned to the earth's surface at the end of the logging operation unless the logging unit is cooled by employing a thermoelectric cooling unit, as described in connection with the embodiment of FIG. 4. We have found that disodium orthophosphate is a preferred heat sink material since this material combines both a relatively high heat of fusion and a high density and melts at the somewhat higher temperature of 36.1° C. It will, of course, be understood that other suitable heat sink materials may be employed insofar as the present invention is concerned.

A detector assembly indicated generally at 170 is connected to the end wall 158 and comprises an outer tubular sleeve 172, preferably of aluminum, which may be secured to the end wall 158 by means of the screws 174. The photomultiplier tube 148 with its associated socket and electronics, is positioned within the sleeve 172 and a scintillation crystal 176, is positioned in the assembly 170 in intimate light transmitting contact with the end window of the photomultiplier 148. A mu-metal shield 178 is provided around the photomultiplier tube 148 to shield this tube from undesired electromagnetic signals. Also, the scintillation crystal 176 is enclosed in a mass 180 of silicone foam material and the end wall 182 of the assembly 170 is also protected from the end wall 118 of the Dewar flask by a similar layer 184 of foam shock mounting material.

As mentioned heretofore, the logging unit 88 is arranged to be positioned above the other electronic circuitry of the logging system. This means that the conductors of the logging system must extend around the Dewar flask 110 so that connections can be established from the cable head, which is connected to the upper end wall 94, and the electronic circuitry positioned below the unit 88. These conductors are indicated generally by the conductor 190 which extends from one of the terminals secured to the end wall 92, through one of the openings 104 in the plate 100, then alongside the outer sleeve 112 of the Dewar flask 110 between this sleeve and the outer housing 90 to the top of the flask 110 and then through apertures in a plate 192 which is similar to the plate 100 and is secured to insulated terminals mounted in the end wall 94. It will be appreciated that a number of conductors such as the conductor 190 may be provided depending upon the electronic circuitry of the remaining portions of the logging system.

Since the conductors 190 carry various current and voltage signals, including pulse type signals and the like, it has been found that these signals may cause interference with the photomultiplier signals appearing upon the cable 146 since the signals on the cable 146 are of relatively small amplitude. To prevent such interference and in accordance with a further feature of the invention, the outer sleeve 112 of the Dewar flask 110 is directly grounded so that the metal Dewar flask 110 will itself act as an electrical shield for the photomultiplier circuitry positioned within this flask. To this end, a grounding conductor 196 is connected to the end cap 124 of the flask 110 so as to provide a positive ground for the outer sleeve 112 of this flask. In this connection it will be understood that the above described shielding action is possible only because the inner and outer walls of the flask 110 are made of metal.

In the embodiment of FIGS. 5-7 the leakage of heat into the interior of the flask 110 takes place primarily around the stopper end of this flask. This heat leakage is minimized first by employing thin stainless steel walls for the flask 110 which permit heat leakage only in the area around the weld 121. Secondly, what little heat is introduced through the evacuated stopper 134 and around the weld 121 is blocked by the thermal insulation 150 which is positioned between the stopper and the heat sink assembly 152. Finally, heat that is transmitted through the insulation 150 is absorbed in the heat sink material in the space 168 so that the temperature in the area surrounding the photomultiplier 148 and crystal 176 is stabilized at the melting point of the heat sink material. All of these factors contribute to the prolongation of the time during which the logging system can be used in a high temperature well. In this connection it will be understood that stopper 134 may be provided with connecting rings and a pool of mercury in the manner described in the embodiment of FIGS. 1-3, to provide for fast resetting of the logging unit to its original temperature condition. In such case the end cap 156 of the heat sink assembly would be connected to the ring on the inner end of the stopper 134 through a heavy conductor and the outer end 140 of this stopper would be connected by a similar heavy conductor to the end wall 92. It will also be understood that a thermoelectric cooling device, similar to the device 70 in the embodiment of FIG. 4, may be employed to cool the heat sink material in the space 168 prior to logging, as described in detail heretofore in connection with the embodiment of FIG. 4.

While there have been described what are at present considered to be the preferred embodiments of the invention, it will be understood that various modifications may be made therein which are within the true spirit and scope of the invention as defined in the appended claims.

We claim:

1. In a well logging system, an elongated housing, an element of said well logging system positioned within said housing, heat sink means in thermally conductive relation to said well logging element for stabilizing the temperature thereof, means for normally insulating said heat sink means from said housing so that said temperature stabilization is maintained for a relatively long period of time even though said housing is subjected to a high temperature environment, and means responsive to the positioning of said housing in a horizontal plane for providing a metallic path of high thermal conductivity between said heat sink means and said housing so that said heat sink means may be returned to its original condition in a relatively short period of time when said housing is removed from said high temperature environment.

2. In a well logging system, an elongated housing, an element of said well logging system positioned within said housing, heat sink means in thermally conductive relation to said well logging element for preventing the temperature thereof from exceeding a predetermined value through change of state of said heat sink means, means for normally insulating said heat sink means from said housing so that said predetermined temperature is not exceeded for a relatively long period of time even though said housing is subjected to a high temperature environment, and means responsive to the positioning of said housing in the horizontal plane and including a liquid heat transfer medium for providing a path of high thermal conductivity between said heat sink means and said housing so that said heat sink means may be returned to its original condition in a relatively short period of time when said housing is removed from said high temperature environment.

3. In a well logging system, an elongated housing, an element of said well logging system positioned within said housing, a mass of material in said housing in proximity to said well logging element and having substantial specific heat, said mass being thermally insulated from said housing when said housing is positioned vertically so that the temperature in the vicinity of said well logging element does not increase rapidly when said housing is subjected to a high temperature environment, a thermoelectric cooling device positioned within said housing, and means operative when said housing is positioned horizontally for connecting said cooling device in a heat transfer path between said mass and said housing, thereby permitting the rapid extraction of heat from said mass by said thermoelectric device.

4. In a well logging system, an elongated housing, an element of said well logging system positioned within said housing, a mass of material in said housing in proximity to said well logging element and having a substantial heat of fusion, a thermoelectric cooling device positioned within said housing in heat extracting relation to said mass, said mass being thermally insulated from said housing when said housing is positioned vertically so that the temperature in the vicinity of said well logging element does not increase rapidly when said housing is subjected to a high temperature environment, and means responsive to the positioning of said housing horizontally for establishing a path of high thermal conductivity between said thermoelectric device and said housing, thereby permitting the rapid extraction of heat from said mass by said thermoelectric device during periods when said housing is horizontally positioned.

5. In a well logging system, an elongated housing, an element of said well logging system positioned within said housing, a mass of material in said housing in proximity to said well logging element and having substantial specific heat, said mass being thermally insulated from said housing when said housing is positioned vertically so that the temperature in the vicinity of said well logging element does not increase rapidly when said housing is subjected to a high temperature environment, a thermoelectric cooling device positioned within said housing, and means operative when said housing is positioned horizontally for connecting said cooling device in heat extracting relation to said mass thereby permitting the rapid extraction of heat from said mass by said thermoelectric device.

6. In a well logging system, an elongated housing, means defining a chamber within said housing and separated from the walls of said housing by an evacuated zone which thermally insulates said chamber from said walls, an element of said well logging system positioned within said chamber, a mass of material having substantial specific heat within said chamber, whereby said housing may be subjected to a high temperature environment without causing a rapid increase in the temperature within said chamber, a pair of electrodes within said evacuated zone, a body of liquid of high thermal conductivity within said evacuated zone and arranged to provide a path of high thermal conductivity between said electrodes when said housing is positioned horizontally, and means including said electrodes and said body for completing a path of high thermal conductivity between said chamber and the walls of said housing so that said mass of material may be rapidly returned to its original condition upon removal of said housing from said high temperature environment.

7. The arrangement as recited in claim 6 wherein said body of liquid is mercury.

8. In a well logging system, an elongated housing, means defining a chamber within said housing and separated from the walls of said housing by an evacuated zone which thermally insulates said chamber from said walls, an element of said well logging system positioned within said chamber, a mass of material having substantial specific heat within said chamber, whereby said housing may be subjected to a high temperature environment without causing a rapid increase in the temperature within said chamber, a thermoelectric device positioned within said chamber and in heat extracting relation to said mass, a pair of electrodes within said evacuated zone, a body of liquid of high thermal conductivity within said evacuated zone and arranged to provide a path of high thermal conductivity between said electrodes when said housing is positioned horizontally, and means including said electrodes and said body for completing a path of high thermal conductivity between said mass and said housing through said evacuated zone so that heat may be rapidly extracted from said mass by said thermoelectric device.

9. In a well logging system, an elongated housing, means defining a chamber within said housing and separated from the walls of said housing by an evacuated zone which thermally insulates said chamber from said walls, an element of said well logging system positioned within said chamber, a mass of material having substantial specific heat within said chamber, whereby said housing may be subjected to a high temperature environment without causing a rapid increase in the temperature within said chamber, a pair of electrodes within said evacuated zone, a body of liquid of high thermal conductivity and low vaporization pressure within said evacuated zone and arranged to provide a path of high thermal conductivity between said electrodes when said housing is positioned horizontally, and means including said electrodes and said body for completing a path of high thermal conductivity between said mass and said housing through said evacuated zone so that heat may be rapidly extracted from said mass when said housing is removed from said high temperature environment.

10. In a well logging system, a tubular housing, an elongated member having inner and outer tubular walls of stainless steel which are sealed at one end to define an evacuated zone therebetween, a hollow cover member removably secured in one end of said inner wall and having a tube extending through the center thereof, the space within said hollow cover member also being evacuated, a temperature regulating assembly comprising a first tubular sleeve of stainless steel positioned within said inner wall of said elongated member and having transverse end walls at either end thereof, a removable plug in one of said end walls, a wiring conduit of stainless steel extending through the length of said tubular sleeve and through said end walls, a second tubular sleeve within said inner wall and connected at one end to said one end wall of said first sleeve and closed at the other end thereof, a mass of material in said first tubular sleeve having substantial specific heat, a heat conducting rod in said first sleeve in intimate contact with said mass of material and connected to said removable plug, a radiation detecting unit positioned within said second sleeve, thermal insulating and shock mounting material positioned in said elongated member at either end of said temperature regulating assembly, and electric cable means extending through said opening in said cover member and said wiring conduit to said radiation detecting unit.

11. In a well logging system, a tubular housing, a Dewar flask having inner and outer walls of stainless steel which are sealed at one end to define an evacuated zone therebetween, a hollow stopper removably secured in the mouth of said flask and having a tube extending through the center thereof, the space within said hollow stopper also being evacuated, a temperature regulating assembly comprising a first tubular sleeve of stainless steel positioned within said flask and having transverse end walls at either end thereof, a removable plug in one of said end walls, a wiring conduit of stainless steel extending through the length of said tubular sleeve and through said end walls, a second tubular sleeve within said flask and connected at one end to said one end wall of said first sleeve and closed at the other end thereof, a mass of material in said first tubular sleeve having substantial specific heat, a heat conducting rod in said first sleeve in intimate contact with said mass of material and connected to said removable plug, a radiation detecting unit positioned within said second sleeve, a mass of thermal insulating material positioned in said flask between said stopper and said temperature regulating assembly, and electric cable means extending through said opening in said cover member, said mass of thermal insulation and said wiring conduit to said radiation detecting unit.

References Cited by the Examiner

UNITED STATES PATENTS

| | | | |
|---|---|---|---|
| 3,038,074 | 6/1962 | Scherbatskoy | 250—71.5 X |
| 3,064,440 | 11/1962 | Waller | 62—3 |
| 3,103,587 | 9/1963 | Ure et al. | 250—83.3 |

RALPH G. NILSON, *Primary Examiner.*

ARCHIE R. BORCHELT, *Examiner.*